United States Patent
Kohgo et al.

(10) Patent No.: US 7,932,327 B2
(45) Date of Patent: Apr. 26, 2011

(54) POLYURETHANE/THIOURETHANE-BASED OPTICAL RESIN AND PROCESS FOR PRODUCING THE SAME

(75) Inventors: Osamu Kohgo, Omuta (JP); Junichi Mohri, Sanbu-gun (JP); Akinori Ryu, Arao (JP); Mamoru Tanaka, Omuta (JP); Kunio Okumura, Mobara (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 67 days.

(21) Appl. No.: 11/990,644

(22) PCT Filed: Aug. 4, 2006

(86) PCT No.: PCT/JP2006/315486
§ 371 (c)(1),
(2), (4) Date: Feb. 19, 2008

(87) PCT Pub. No.: WO2007/020818
PCT Pub. Date: Feb. 22, 2007

(65) Prior Publication Data
US 2009/0227745 A1    Sep. 10, 2009

(30) Foreign Application Priority Data

Aug. 18, 2005 (JP) .................. 2005-237382
Oct. 13, 2005 (JP) .................. 2005-298726
Nov. 25, 2005 (JP) .................. 2005-339721
Mar. 10, 2006 (JP) .................. 2006-065994

(51) Int. Cl.
*C08G 18/75* (2006.01)
*G02B 1/04* (2006.01)
*G02C 7/02* (2006.01)

(52) U.S. Cl. ............. 525/460; 528/85; 528/74; 528/77; 528/75; 528/373

(58) Field of Classification Search .................. 525/453, 525/460; 528/67, 85
See application file for complete search history.

(56) References Cited

U.S. PATENT DOCUMENTS

| 5,059,673 A | * | 10/1991 | Kanemura et al. |
| 5,679,756 A | * | 10/1997 | Zhu et al. |
| 5,942,158 A | * | 8/1999 | Okoroafor et al. ............ 252/586 |
| 6,777,494 B1 | | 8/2004 | Yang et al. |
| 2006/0149018 A1 | | 7/2006 | Kitahara |

FOREIGN PATENT DOCUMENTS

| EP | 0 665 219 A1 | | 8/1995 |
| JP | 02-270859 A | * | 11/1990 |
| JP | 03-124722 A | * | 5/1991 |
| JP | 07-252207 A | * | 10/1995 |
| JP | 07-252341 A | * | 10/1995 |
| JP | 07-316250 A | * | 12/1995 |
| JP | 2002-226456 A | * | 8/2002 |
| KR | 2003-0078494 A | * | 10/2003 |
| WO | WO 97/23529 A1 | * | 7/1997 |
| WO | WO 2004/108787 A1 | * | 12/2004 |
| WO | WO 2007/020817 A1 | * | 2/2007 |

OTHER PUBLICATIONS

Supplementary European Search Report, European Application No. 06782344.3-2115/1923415, dated Mar. 9, 2008.

* cited by examiner

*Primary Examiner* — Randy Gulakowski
*Assistant Examiner* — Rachel Kahn
(74) *Attorney, Agent, or Firm* — Buchanan Ingersoll & Rooney PC

(57) ABSTRACT

Provided is a process which can be carried out upon the production of a polyurethane/thiourethane-based resin with the use of a polyisocyanate compound, a polyol compound, and a polythiol compound, without causing abrupt heat generation or viscosity increase. At least one polyol compound having at least one ether bond and two or more hydroxy groups in a molecule is used as the polyol compound, whereby a large heat generation or an abrupt viscosity increase are prevented from occurring upon blending monomer.

8 Claims, No Drawings

POLYURETHANE/THIOURETHANE-BASED OPTICAL RESIN AND PROCESS FOR PRODUCING THE SAME

TECHNICAL FIELD

The present invention relates to a polyurethane/thiourethane-based resin and a process for producing the same.

BACKGROUND ART

Since plastic lenses are lighter, less fragile, and tintable, as compared with inorganic lenses, therefore, in recent years, the application of plastic lenses to optical elements such as spectacles lenses, camera lenses and the like has increased rapidly.

In particular, spectacles lenses have been required to have various features including optical properties such as (a) high refractive index and (b) low dispersion (high Abbe's number), and being (c) excellent in heat resistance, (d) excellent in impact resistance, (e) easily tintable, (f) excellent in working properties such as cutting properties, or the like. Accordingly, various resin materials for lenses have been developed and used until now.

Representative examples of those can be mentioned by polythiourethane-based resins (Patent Documents 1 and 2). Among the polythiourethane-based resins, a polythiourethane-based resin obtained by using a polyisocyanate compound represented by Formula (1) (Patent Document 3) is used to provide a plastic lens having a high refractive index and low dispersion property, and exhibiting excellent heat resistance and impact resistance, thus it has been widely used for spectacles lenses.

(1)

In Patent Document 4, there disclosed a plastic lens prepared by using a polyurethane/thiourethane-based resin, where the lens has a refractive index of 1.545 to 1.556 and excellent impact resistance, and is obtained by the reaction between diisocyanate oligomer obtained by reacting specific amounts of isophorone diisocyanate, hexamethylene diisocyanate, and a divalent alcohol at a temperature between 40° C. and 70° C., and specific polythiol.

In addition, in the case of industrially preparing lenses, generally a large quantity of monomeric mixture is prepared at once, filtered thorough a fine filter of about 1 to 3 micron over number of hours to remove fine insoluble fractions and dust, and then the resultant is injected into a mold to be cured.

Therefore, there has been demanded a simple preparation of monomeric mixture, little heat generation upon blending, low viscosity of the mixture, low rate in viscosity increase, excellent filtration property and the like, from the viewpoints of handleability and productivity.

However, when carrying out the reaction between a polyisocyanate compound, a polythiol compound, and a polyol compound, during the preparation of the lens prepared by using a polyurethane/thiourethane-based resin, there has been a case where the reaction between an isocyanate group and a thiol group is accelerated by the heat caused from the reaction between a hydroxy group and an isocyanate group because the reaction of an isocyanate group with a hydroxy group proceeds faster than the reaction of an isocyanate group with a thiol group, thus may result in a runaway reaction. In consequent, depending on the conditions, abrupt heat generation by monomer upon blending, high viscosity, thereby being difficult to carry out injection into a mold, have come up as the concerns. In addition, there is room for improvement in blending large amount of monomer. Accordingly, there has been demanded a blending method by which a large heat generation is not occurred even if a polyisocyanate compound, a polythiol compound, and a polyol compound are blended in large quantity, and the temperature is sufficiently controlled.

In the aforementioned Patent Document 4, in order to avoid such runaway reaction, there disclosed a method which includes reacting a mixture of isophorone diisocyanate and hexamethylene diisocyanate with ethylene glycol or propylene glycol as s particularly preferable divalent alcohol compound at a temperature between 40° C. and 70° C. for 19 hours, so as to first obtain diisocyanate oligomer, and then carrying out a polymerization with a thiol compound.

In Patent Document 5, there disclosed that a molded product having high impact strength can be obtained by polymerizing an isocyanate compound with a specific structure, an aliphatic diol compound, and a polythiol compound with a specific structure.

However, in the case of employing tris(6-isocyanatohexyl) isocyanulate which is one of the isocyanate compounds with a specific structure, since it is a trifunctional compound, initial viscosity thereof is high and this viscosity increases further while proceeding the polymerization, thereby leading to difficulty in blending monomer in large quantity.

[Patent Document 1] Japanese Patent Laid-open No. 2-270859
[Patent Document 2] Japanese Patent Laid-open No. 252207
[Patent Document 3] Japanese Patent Laid-open No. 3-124722
[Patent Document 4] Korean Patent Laid-open No. 2003-078494
[Patent Document 5] Pamphlet of PCT Publication No. 2004/108787

DISCLOSURE OF THE INVENTION

The present invention is made in the light of the above considerations, and is to provide a method of preparing a polymerizable solution without causing a large heat generation and an abrupt viscosity increase upon blending during producing a polyurethane/thiourethane-based optical resin using a polyisocyanate compound, a polyol compound, and a polythiol compound, and which further provides an optical resin prepared by using the polymerizable solution, and a process for producing the same.

The present inventors have conducted extensive studies to solve the above problems, and as a result, they have found that by the use of a polyol compound having at least one ether bond and two or more hydroxy groups in a molecule as the polyol compound, even if in a case of blending monomer, a blending manipulation can be carried out without causing the heat generation and abrupt viscosity increase which being the problems upon the production. Thus, they have completed the invention.

That is, the invention includes:
[1] a process for producing a polyurethane/thiourethane-based resin, including polymerizing the following component (A), component (B), and component (C):

(A) at least one polyisocyanate compound selected from the group consisting of an alicyclic isocyanate compound represented by the following Formula (1) or Formula (2):

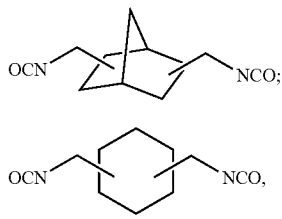
(1)

(2)

hexamethylene diisocyanate, and dicyclohexylmethane diisocyanate;

(B) at least one polythiol compound optionally having at least one (poly)sulfide bond in a molecule; and (C) at least one polyol compound having at least one ether bond and two or more hydroxy groups in a molecule;

[2] the process for producing a polyurethane/thiourethane-based resin described in [1], which further includes adding the component (C) to the component (A), thereafter adding the component (B) thereto, and heat-polymerizing the obtained mixture in the presence of a catalyst;

[3] the process for producing a polyurethane/thiourethane-based resin described in [1], which further includes adding the component (B) and the component (C) to the component (A), and heat-polymerizing the obtained mixture in the presence of a catalyst;

[4] the process for producing a polyurethane/thiourethane-based resin described in any one of [1] to [3], in which the used ratio of the (A) the polyisocyanate compound, to the (B) the polythiol compound optionally having at least one (poly) sulfide bond in a molecule, to the (C) the polyol compound having at least one ether bond and two or more hydroxy groups in a molecule, is such that the molar ratio of functional groups represented by NCO/(SH+OH) is not less than 0.5 and not more than 3.0, and when given that the number of moles of a hydroxy group in the (C) the polyol compound having at least one ether bond and two or more hydroxy groups in a molecule is p, and the number of moles of a thiol group in the (B) the polythiol compound optionally having at least one (poly) sulfide bond in a molecule is r, p/(p+r) is not less than 0.001 and not more than 0.40;

[5] the process for producing a polyurethane/thiourethane-based resin described in any one of [1] to [4], in which the (A) the polyisocyanate compound is at least one kind selected from compounds represented by the Formula (1) and/or the Formula (2);

[6] the process for producing a polyurethane/thiourethane-based resin described in any one of [1] to [5], in which the (C) the polyol compound having at least one ether bond and two or more hydroxy groups in a molecule is at least one kind selected from the group consisting of following (D), (E), (F), and (G):

(D) diethylene glycol or triethylene glycol;

(E) polyol having an average molecular weight of 200 or larger and 2,000 or smaller, which is obtained by a chain extension of the terminal by reacting a compound represented by following Formula (3) with ethylene oxide and/or propylene oxide:

HO—R1—OH (3)

(in above Formula (3), R1 is an ethylene group or a propylene group);

(F) polyol having an average molecular weight of 180 or larger and 1,000 or smaller, which is obtained by a chain extension of the terminal by reacting a compound represented by following Formula (4) with ethylene oxide and/or propylene oxide:

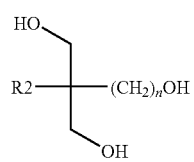
(4)

(in above Formula (4), n is 0 or 1, and R2 is a hydrogen atom, a methyl group, an ethyl group, or a hydroxyl group); and (G) polyol having an average molecular weight of 840 or larger and 1,530 or smaller, which is obtained by a chain extension of the terminal by reacting sorbitol with ethylene oxide and/or propylene oxide;

[7] the process for producing a polyurethane/thiourethane-based resin described in any one of [1] to [6], the (B) the polythiol compound optionally having at least one (poly) sulfide bond in a molecule is at least one kind selected from the group consisting of 4-mercaptomethyl-1,8-dimercapto-3,6-dithiaoctane, 1,1,3,3-tetrakis(mercaptomethylthio)propane, 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane;

[8] a polyurethane/thiourethane-based resin produced by the process described in any one of [1] to [7];

[9] an optical component including the polyurethane/thiourethane-based resin described in [8];

[10] a lens including the optical component described in [9];

[11] a spectacle lens including the lens described in [10]; and

[12] a use of the polyurethane/thiourethane-based resin produced by the process described in anyone of [1] to [7] as an optical component.

BEST MODE FOR CARRYING OUT THE INVENTION

The process for producing a polyurethane/thiourethane-based resin of the invention includes polymerizing a component (A), a component (B), and a component (C) shown below:

(A) at least one polyisocyanate compound selected from the group consisting of an alicyclic isocyanate compound represented by the following Formula (1) or Formula (2):

(1)

(2)

hexamethylene diisocyanate, and dicyclohexylmethane diisocyanate;

(B) at least one polythiol compound optionally having at least one (poly)sulfide bond in a molecule; and (C) at least one polyol compound having at least one ether bond and two or more hydroxy groups in a molecule.

For the production process, the process step in which components (A) to (C) are polymerized is, for example, a process step in which a mixture of components (A) to (C) is heat-polymerized in the presence of a catalyst.

For the invention, the order of mixing the components is not particularly limited, and for example, there may be employed:

(i) a method of adding the component (C) to the component (A), thereafter adding the component (B) thereto, and polymerizing the obtained mixture; or (ii) a method of adding the component (B) and the component (C) to the component (A), and polymerizing the obtained mixture.

For the above (i), it is preferable that the component (B) is added after adding whole component (C) to the component (A). Alternatively, the component (B) may be added after preliminarily reacting the component (A) with the component (C) and subjected to polymerization. More specifically, (B) at least one polythiol compound optionally having at least one (poly)sulfide bond in a molecule may be added after adding (C) at least one polyol compound having at least one ether bond and two or more hydroxy groups in a molecule to (A) at least one polyisocyanate compound, and the obtained mixture may be heat-cured in the presence of a catalyst so as to form a resin.

More specifically in the case of above (ii),
(A) at least one polyisocyanate compound,
(B) at least one polythiol compound optionally having at least one (poly)sulfide bond in a molecule, and
(C) at least one polyol compound having at least one ether bond and two or more hydroxy groups in a molecule,
may be mixed at once, and the obtained mixture may be heat-cured in the presence of a catalyst to form a resin.

According to the production process of the invention, since the compound used as the component (C) is a polyol compound having ether bond(s) in a molecular structure, a resin can be produced by any of aforementioned method (i) a prepolymer method and method (ii) a batch method without causing a large heat generation or an abrupt viscosity increase upon blending the raw materials. Further, since it is possible to obtain a homogeneous mixture of the components (A) to (C), a homogeneous resin can be produced.

In addition, when a polyurethane/thiourethane-based resin is produced in accordance with the production process of the invention, a runaway reaction can be prevented from occurring upon blending monomer. Thus, an extreme increase in monomer viscosity is not occurred, and the viscosity of a monomeric mixture, that is a mixture of components (A) to (C), upon the injection into a mold can be controlled to be 500 mPa·s or lower at a temperature of at least 20° C., preferably not lower than ° C. 20 and not higher than 30° C. Therefore, injection of the mixture can be easily carried out. When the viscosity at a temperature of 20 or higher and 30° C. or lower is too high, the fluidity decreases, thereby becoming difficult to be injected in general.

The viscosity of the mixture of components (A) to (C) is, for example, a viscosity measured on a liquid using a B-type viscometer, where the liquid is prepared from a mixed solution obtained by adding components (A) to (C) in accordance with the predetermined order and method, by being mixed and dissolved at a predetermined temperature for 30 minutes and being allowed for a reaction to take place.

According to the production process of the invention, a polyurethane/thiourethane-based resin is produced. Such resin is suitable, for example, as an optical resin. More specifically, such resin is suitable for use as lenses for spectacles and the like, or materials for other optical components.

Hereinafter, aforementioned components (A) to (C) will be explained, respectively, with reference to specific examples, but the invention is not limited by those exemplified compounds mentioned below. For the invention, with respect to each component, exemplified compounds may be used alone or in combination of plural kinds.

First, (A) the polyisocyanate compound will be explained.

Of the component (A), the alicyclic isocyanate compound represented by above Formula (1) can be exemplified by 2,5-bis(isocyanatomethyl)-bicyclo[2,2,1]heptane, 2,6-bis(isocyanatomethyl)-bicyclo[2,2,1]heptane, a mixture of 2,5-bis(isocyanatomethyl)-bicyclo[2,2,1]heptane and 2,6-bis(isocyanatomethyl)-bicyclo[2,2,1]heptane, or the like.

More specifically as the alicyclic isocyanate compound represented by above Formula (1), 2,5(6)-bis(isocyanatomethyl)-bicyclo[2.2.1]heptane can be employed. Herein, 2,5 (6)-bis(isocyanatomethyl)-bicyclo[2.2.1]heptane includes at least one of 2,5-bis(isocyanatomethyl)-bicyclo[2.2.1]heptane and 2,6-bis(isocyanatomethyl)-bicyclo[2.2.1]heptane, and which specifically may be any of following (i) to (iii):

(i) a single product of 2,5-bis(isocyanatomethyl)-bicyclo[2.2.1]heptane (ii) a single product of 2,6-bis(isocyanatomethyl)-bicyclo[2.2.1]heptane (iii) a mixture of 2,5-bis(isocyanatomethyl)-bicyclo[2.2.1]heptane and 2,6-bis(isocyanatomethyl)-bicyclo[2.2.1]heptane.

Further, the alicyclic isocyanate compound represented by above Formula (2) can be exemplified by 1,4-bis(isocyanatomethyl)cyclohexane, 1,3-bis(isocyanatomethyl)cyclohexane, or 1,2-bis(isocyanatomethyl)cyclohexane.

As the component (A), in addition, hexamethylene diisocyanate and dicyclohexylmethane diisocyanate may be exemplified, and these may be used alone or as a mixture of two or more kinds. Among these, the component (A) is preferably at least one kind selected from the compounds represented by above formula (1) and/or above Formula (2), from the viewpoints of heat resistance and mechanical properties, of the resin to be obtained. Any one of these may be used, or these may be used in combination.

Next, the component (B) will be explained.

As (B) the polythiol compound optionally having at least one (poly)sulfide bond in a molecule, for example, following compounds can be mentioned:

an aliphatic polythiol compound such as methanedithiol, 1,2-ethanedithiol, 1,1-propanedithiol, 1,2-propanedithiol, 1,3-propanedithiol, 2,2-propanedithiol, 1,4-butanedithiol, 2,3-butanedithiol, 1,5-pentanedithiol, 1,6-hexanedithiol, 1,2,3-propanetrithiol, 1,1-cyclohexanedithiol, 1,2-cyclohexanedithiol, 2,2-dimethylpropane-1,3-dithiol, 3,4-dimethoxybutane-1,2-dithiol, 2-methylcyclohexane-2,3-dithiol or the like;

an aliphatic polythiol compound having (poly) sulfide bond(s) such as 4-mercaptomethyl-1,8-dimercapto-3,6-dithiaoctane, 4,8-dimercaptomethyl-1,11-dimercapto-3,6,9-trithiaundecane, 5,7-dimercaptomethyl-1,11-dimercapto-3,6,9-trithiaundecane, 4,7-dimercaptomethyl-1,11-dimercapto-3,6,9-trithiaundecane, tetrakis(mercaptomethyl)methane, 1,1,3,3-tetrakis(mercaptomethylthio)propane, 1,1,5,5-tetrakis(mercaptomethylthio)-3-thiapentane, 1,1,6,6-tetrakis(mercaptomethylthio)-3,4-dithiahexane, 2,2-bis(mercaptomethyl)-1,3-propanedithiol, bis(mercaptomethyl)sulfide, bis(mercaptomethyl)disulfide, bis(mercaptoethyl)sulfide, bis(mercaptoethyl)disulfide, bis(mercaptopropyl)sulfide, bis(mercaptopropyl)disulfide, bis(mercaptomethylthio)methane, tris(mercaptomethylthio)methane, bis(mercaptoethylthio)methane, tris(mercaptoethylthio)methane, bis(mercaptopropylthio)methane, 1,2-bis(mercaptomethylthio)ethane, 1,2-bis(mercaptoethylthio)ethane, 1,3-bis(mercaptomethylthio)propane, 1,3-bis(mercaptoethylthio)propane, 1,3-bis(mercaptopropylthio)propane, 1,2,3-tris (mercaptomethylthio)propane, 1,2,3-tris (mercaptoethylthio)propane, 1,2,3-tris (mercaptopropylthio)propane, tetrakis(mercaptomethylthio)methane, tetrakis(mercaptoethylthiomethyl)methane, tetrakis(mercaptopropylthiomethyl)methane, 2,5-dimercapto-1,4-dithiane, 2,5-bismercaptomethyl-1,4-dithiane or the like;

an aliphatic polythiol compound having ester bond(s) such as ethyleneglycolbis(2-mercaptoacetate), ethyleneglycolbis(3-mercaptopropionate), diethyleneglycol(2-mercaptoacetate), diethyleneglycol(3-mercaptopropionate), 2,3-dimercapto-1-propanol(3-mercaptopropionate), 3-mercapto-1,2-propanediolbis(2-mercaptoacetate), 3-mercapto-1,2-propanediolbis(3-mercaptopropionate), trimethylolpropanetris(2-mercaptoacetate), trimethylolpropanetris(3-mercaptopropionate), trimethylolethanetris(2-mercaptoacetate), trimethylolethanetris(3-mercaptopropionate), pentaerythritoltetrakis(2-mercaptoacetate), pentaerythritoltetrakis(3-mercaptopropionate), glycerintris(2-mercaptoacetate), glycerintris(3-mercaptopropionate), 1,4-cyclohexanediolbis(2-mercaptoacetate), 1,4-cyclohexanediolbis(3-mercaptopropionate), hydroxymethylsulfide bis(2-mercaptoacetate), hydroxymethylsulfide bis(3-mercaptopropionate), hydroxyethylsulfide (2-mercaptoacetate), hydroxyethylsulfide(3-mercaptopropionate), hydroxymethyldisulfide(2-mercaptoacetate), hydroxymethyl disulfide(3-mercaptopropionate), (2-mercaptoethylester)thioglycolate, bis(2-mercaptoethylester)thiodipropionate or the like; and a compound having aromatic ring(s) such as 1,2-dimercaptobenzene, 1,3-dimercaptobenzene, 1,4-dimercaptobenzene, 1,2-bis(mercaptomethyl)benzene, 1,4-bis(mercaptomethyl)benzene, 1,2-bis(mercaptoethyl)benzene, 1,4-bis(mercaptoethyl)benzene, 1,2,3-trimercaptobenzene, 1,2,4-trimercaptobenzene, 1,3,5-trimercaptobenzene, 1,2,3-tris (mercaptomethyl)benzene, 1,2,4-tris(mercaptomethyl)benzene, 1,3,5-tris(mercaptomethyl)benzene, 1,2,3-tris (mercaptoethyl)benzene, 1,3,5-tris(mercaptoethyl)benzene, 1,2,4-tris(mercaptoethyl)benzene, 2,5-toluenedithiol, 3,4-toluenedithiol, 1,4-naphthalenedithiol, 1,5-naphthalenedithiol, 2,6-naphthalenedithiol, 2,7-naphthalenedithiol, 1,2,3,4-tetramercaptobenzene, 1,2,3,5-tetramercaptobenzene, 1,2,4,5-tetramercaptobenzene, 1,2,3,4-tetrakis(mercaptomethyl)benzene, 1,2,3,5-tetrakis(mercaptomethyl)benzene, 1,2,4,5-tetrakis(mercaptomethyl)benzene, 1,2,3,4-tetrakis(mercaptoethyl)benzene, 1,2,3,5-tetrakis(mercaptoethyl)benzene, 1,2,4,5-tetrakis(mercaptoethyl)benzene, 2,2'-dimercaptobiphenyl, 4,4'-dimercaptobiphenyl or the like. Of these, one kind alone or two or more kinds can be used.

Among these, the component (B) is preferably 4-mercaptomethyl-1,8-dimercapto-3,6-dithiaoctane, 2,5-bismercaptomethyl-1,4-dithiane, 1,1,3,3-tetrakis(mercaptomethylthio) propane, 5,7-dimercaptomethyl-1,11-dimercapto-3,6,9-trithiaundecane, 4,7-dimercaptomethyl-1,11-dimercapto-3,6,9-trithiaundecane, or 4,8-dimercaptomethyl-1,11-dimercapto-3,6,9-trithiaundecane, from the viewpoints of economic efficiency and optical properties of the resin to be obtained. However, the invention is not limited by these exemplified compounds. These may be used alone, respectively, or as a mixture of two or more kinds.

Next, the component (C) will be explained.

The (C) polyol compound having at least one ether bond and two or more hydroxy groups in a molecule is, for example, at least one kind selected from the group consisting of following (D), (E), (F), and (G):

(D) diethylene glycol or triethylene glycol;

(E) a polyol compound having an average molecular weight of 200 or larger and 2,000 or smaller, which is obtained by a chain extension of the terminal by reacting a compound represented by following Formula (3) with ethylene oxide and/or propylene oxide, or a mixture of two or more kinds thereof:

HO—R1-OH  (3)

(in above Formula (3), R1 is an ethylene group or a propylene group);

(F) a polyol compound having an average molecular weight of 180 or larger and 1,000 or smaller, which is obtained by a chain extension of the terminal by reacting a compound represented by following Formula (4) with ethylene oxide and/or propylene oxide, or a mixture of two or more kinds thereof:

(4)

(in above Formula (4), n is 0 or 1, and R2 is a hydrogen atom, a methyl group, an ethyl group, or a hydroxyl group); and (G) a polyol compound having an average molecular weight of 840 or larger and 1,530 or smaller, which is obtained by a chain extension of the terminal by reacting sorbitol with ethylene oxide and/or propylene oxide; or a mixture of two or more kinds thereof.

Those mentioned above as (C) the polyol compound having at least one ether bond and two or more hydroxy groups in a molecule may be used alone or in combination of plural kinds. In addition, other polyols may also be used in addition to (C) the polyol compounds having at least one ether bond and two or more hydroxy groups in a molecule. In this case, a mixture of the component (C) and other polyol may also be used.

In the invention, the average molecular weight of the component (C) is specifically a molecular weight calculated from the formula:

Hydroxyl Value (mgKOH/g)=number of average functional groups×56,100/molecular weight.

In the above formula, the hydroxyl value represents 'mg number' of KOH required for neutralizing carboxylic acids produced as a by-product upon esterifying the hydroxyl group in 1 g of polyol with acid anhydride.

Herein, the used ratio of (A) the polyisocyanate compound, (B) the polythiol compound optionally having at least one (poly) sulfide bond in a molecule and the (C) the polyol compound having at least one ether bond and two or more hydroxy groups in a molecule, is such that the molar ratio of functional groups represented by NCO/(SH+OH) is in the range of 0.5 or more and 3.0 or less, preferably 0.5 or more and 1.5 or less, and particularly preferably 0.8 or more and 1.2 or less. Within this range, a resin with well-balanced refractive index, impact resistance, tintability, and heat resistance can be obtained.

Here, there is a concern that the curing property of the polymerizable composition deteriorates when the value of NCO/(SH+OH) is too small. The curing property of the polymerizable composition can be further improved by making NCO/(SH+OH) to be 0.5 or larger, preferably 0.8 or larger. In this manner, mechanical properties such as resin strength or impact resistance of the resin can be further improved.

In addition, there is a concern that the refractive index of the resin lowers when the value of NCO/(SH+OH) is too large because the refractive index increases as the amount of SH groups in the resin increases. The refractive index of the resin can be increased by making NCO/(SH+OH) to be 3.0 or smaller, preferably 1.5 or smaller, and more preferably 1.2 or smaller. In this manner, the resin can be further preferably employed to, for example, an optical component.

Further, when given that the number of moles of a hydroxy group in the component (C) is p and the number of moles of a thiol group in the component (B) is r, p/(p+r) is in the range of usually 0.001 or more and 0.40 or less, preferably 0.03 or more and 0.35 or less, and particularly preferably 0.05 or more and 0.30 or less. Also in this manner, a resin with well-balanced refractive index, impact resistance, tintability, and heat resistance can be obtained.

Here, there is a concern that the impact resistance of the resin deteriorates when the value of p/(p+r) is too small because the impact resistance improves as the amount of OH groups in the resin increases. The impact resistance of the resin can be improved by making p/(p+r) to be 0.001 or larger, preferably 0.03 or larger, and more preferably 0.05 or larger.

Meanwhile, there is a concern that the refractive index of the resin lowers when the amount of OH groups is too large with respect to that of SH groups. At this point of view, for an upper limit of the content of hydroxy groups, provided that the number of moles of a hydroxy group in the component (C) is p and the number of moles of a thiol group in the component (B) is r, p/(p+r) is in the range of usually 0.40 or smaller, preferably 0.35 or smaller, and more preferably 0.30 or smaller. Within such range, lowering of the refractive index of the resin can also be controlled. In this manner, for example, a polyurethane/thiourethane-based resin suitable for use as lenses such as spectacles lenses and the like, with high refractive index and low dispersion, can be obtained.

The balance between the mechanical properties and refractive index can be further improved by making the molar ratio of the functional groups represented by NCO/(SH+OH) to be in the above range and also by making p/(p+r) to be in the above range.

From the viewpoints of economic efficiency and handleability, or optical properties of the resin to be obtained, a combination of (A) the polyisocyanate compound, (B) the polythiol compound optionally having at least one (poly) sulfide bond in a molecule, and (C) the polyol compound having at least one ether bond and two or more hydroxy groups in a molecule is preferably the combination of:

at least one kind selected from compounds represented by above Formula (1) and above Formula (2), dicyclohexylmethane diisocyanate, and hexamethylene diisocyanate, as (A) the polyisocyanate compound, at least one kind selected from the group consisting of 4-mercaptomethyl-1,8-dimercapto-3,6-dithiaoctane, 1,1,3,3-tetrakis(mercaptomethylthio)propane, 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane, as (B) the polythiol compound optionally having at least one (poly)sulfide bond in a molecule, and at least one kind selected from compounds represented by above (D), (E), (F), and (G), as (C) the polyol compound having at least one ether bond and two or more hydroxy groups in a molecule.

A combination of components (A) to (C) is more preferably the combination of:

at least one kind selected from compounds represented by the above Formula (1) and/or Formula (2), as (A) the polyisocyanate compound, at least one kind selected from the group consisting of 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane, as (B) the polythiol compound optionally having at least one (poly)sulfide bond in a molecule, and at least one kind selected from compounds represented by the (D), (E), (F), and (G), as (C) the polyol compound having at least one ether bond and two or more hydroxy groups in a molecule.

A combination of components (A) to (C) is most preferably the combination of:

at least one kind selected from compounds represented by the above Formula (1), as (A) the polyisocyanate compound, at least one kind selected from the group consisting of 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane, as (B) the polythiol compound optionally having at least one (poly)sulfide bond in a molecule, and at least one kind selected from the group consisting of diethylene glycol, triethylene glycol, polyol having an average molecular weight of 200 or larger and 2,000 or smaller, which is obtained by reacting the compound represented by above Formula (3) with ethylene oxide and/or propylene oxide, polyol having an average molecular weight of 180 or larger and 1,000 or smaller, which is obtained by reacting the compound represented by above Formula (4) with ethylene oxide and/or propylene oxide, and polyol having an average molecular weight of 840 or larger and 1,530 or smaller, which is obtained by reacting sorbitol with propylene oxide, as (C) the polyol compound having at least one ether bond and two or more hydroxy groups in a molecule.

The polyurethane/thiourethane-based resin of the invention is a copolymer of above components (A) to (C), and the resin includes a urethane bond formed by an isocyanate group and a hydroxy group, and a thiourethane bond formed by an isocyanate group and a thiol group.

For some purposes, it may not be a problem for the resin of the invention to include bonds other than the urethane bond and the thiourethane bond, such as an allophanate bond, a urea bond, or a biuret bond, within the scope of not affecting the productivity by the monomer viscosity.

For example, there are many cases where further subjecting a urethane bond or an S-alkyl thiocarbamic acid ester bond to a reaction with an isocyanate group to increase the cross-linkage density gives a favorable result. In this case, the reaction temperature is increased up to at least 100° C. or higher and the isocyanate component is a lot used.

Alternatively, some of amines or the like may be employed in combination, thereby allowing the employ of a urea bond or a biuret bond. In such a case of employing compounds other than polyol compounds, polythiol compounds, or thiol compounds each having a hydroxy group, which can react with an isocyanate compound, it is necessary to pay attention particularly to coloring.

For the invention, as in a known molding process, a variety of additives may be added, if necessary, which are, for example, a chain extender, a crosslinking agent, a light stabilizer, an ultraviolet absorber, an antioxidant, dye, pigment, filler, and so on. For the purpose of adjusting a reaction rate to a desired level, a suitable amount of S-alkyl thiocarbamic acid ester or a known reaction catalyst which is usable in the manufacture of polyurethane can be added.

The polyurethane/thiourethane-based resin of the invention, for example, a polyurethane/thiourethane-based lenses can be usually obtained by casting polymerization. It is preferable that an internal mold release agent typified by phosphate esters is preliminarily added to the polymerizable composition for the invention, that is the composition including components (A) to (C), or alternatively that the mold is preliminarily subjected to a treatment with an external mold release agent, so as to promote a mold release between the mold and the lens after completing the polymerization.

Next, processes for producing the resin of the invention will be described in more detail.

According to the invention, since the amount of heat generated upon blending is small when (C) the polyol compound having at least one ether bond and two or more hydroxy groups in a molecule is used, (A) the polyisocyanate compound, (B) the polythiol compound, and (C) the polyol compound having at least one ether bond and two or more hydroxy groups in a molecule may be added and mixed at once or may be added in any order to be mixed, upon the monomer blending.

In addition, during the production of the resin related to the invention, there can be carried out a modification of resin such as for improving the heat resistance by: adding (C) at least one polyol compound having at least one ether bond and two or more hydroxy groups in a molecule to (A) at least one polyisocyanate compound, and then further adding thereto (W) at least one compound selected from polyol compounds having two or more hydroxy groups but not having an ether bond in a molecule, and/or (poly)hydroxy(poly)mercapto compounds having at least one hydroxy group and at least one thiol group, and (B) at least one polythiol compound optionally having at least one (poly)sulfide bond in a molecule.

Among (W) polyol compounds having two or more hydroxy groups but not having an ether bond in a molecule, and/or (poly)hydroxy(poly)mercapto compounds having at least one hydroxy group and at least one thiol group, specific examples of the polyol compounds having two or more hydroxy groups but not having an ether bond in a molecule include glycerin, ethylene glycol, propylene glycol, butanediol such as 1,4-butanediol, pentanediol, hexanediol, heptanediol, octanediol, nonanediol, and decanediol. Specific examples of the (poly)hydroxy(poly)mercapto compounds having at least one hydroxy group and at least one thiol group include 2-mercaptoethanol, thioglycerin, 1,4-dithioerythritol, 1,4-dithiothreitol and the like. However, the compounds are not limited by those. These may be used alone, respectively, or as a mixture of two or more kinds.

Among these, those preferred are 2-mercaptoethanol, thioglycerin, glycerin, ethylene glycol, propylene glycol, 1,4-butanediol, 1,4-dithioerythritol, and 1,4-dithiothreitol, from the viewpoints of economic efficiency and handleability, or optical properties of the resin to be obtained. These may be used alone, respectively, or two or more kinds thereof may be mixed for a use.

For the invention, in the case of employing (W) the polyol compounds having two or more hydroxy groups but not having an ether bond in a molecule, and/or the (poly) hydroxy (poly)mercapto compounds having at least one hydroxy group and at least one thiol group, in combination, it is preferably added in the presence of (C) the polyol compound having at least one ether bond and two or more hydroxy groups in a molecule, for the purpose of avoiding the runaway reaction or the like upon blending.

In regard to the order of adding the catalyst and the mold release agent to be used, for example, there may be employed a method of preliminarily dissolving in a polyisocyanate compound, a polyol compound having at least one ether bond and two or more hydroxy groups, or a polythiol compound, or a method of adding to a mixture of those, but not limited by those exemplified methods and the order may be appropriately selected considering the handleability, safety, adequacy, and the like. For the form of the catalyst, mold release agent, and other additives, upon addition, they may be directly added as it is, or may be prepared into a master liquid by being dissolved in some of monomers used so as to be then added.

The monomer mixed solution obtained in such manner may be subjected to degasification, if necessary, for the purpose of preventing the generation of bubbles upon forming the resin. Thereafter, the resultant is injected into a mold, subjected usually to polymerization under gradual heating from a low temperature to a high temperature, and then taken out from the mold.

According to the invention, in regard to the production of the polyurethane/thiourethane-based resin, a polymerizable solution can be prepared without causing a large heat generation or an abrupt viscosity. Thus, it becomes possible, for example, to produce a homogeneous resin.

In the production process of the invention, the total amount of (A) the polyisocyanate compound, (C) the polyol compound having at least one ether bond and two or more hydroxy groups in a molecule, and (B) the polythiol compound optionally having at least one (poly)sulfide bond in a molecule, to be used may be, for example, 20 kg or more. According to the invention, a stable production of the resin even in a scale-up state becomes possible as polyol as the component (C) is employed.

The polyurethane/thiourethane-based resin of the invention obtained in such manner has high refractive index and low dispersion property, and those also excellent in heat resistance, tintability, impact resistance, and the like can be obtained depending on the type of monomer used, thereby being ideal for use as a material for an optical component such as spectacle lenses and camera lenses.

More specifically, since the polyurethane/thiourethane-based resin of the invention is colorless and transparent, and has excellent optical properties, the resin is ideal for use as an optical component or an optical element material such as lenses, for example, spectacle lenses or the like, prism, camera lens, optical fiber, information recording plate, filter, light-emitting diode and the like.

The polyurethane/thiourethane lens obtained according to the invention can be tinted for a use. In this case, the lens can be tinted, for example, in accordance with the following generally known tinting methods. That is, (1) a method of immersing a lens in a tinting liquid,
(2) a method of subjecting coating with the use of a coating agent containing a dye, or providing a tintable coating layer and tinting the provided coating layer,
(3) a method of polymerizing monomer raw materials in which tintable materials are contained,
(4) a method of heating a sublimation dye to allow sublimation, and the like.

The polyurethane/thiourethane-based lens related to the invention may be used as having a coating layer on one side or both sides thereof, if necessary. As the coating layer, a primer layer, a hard coat layer, an antireflection film, an antifogging coat film, an antistaining layer, a water-repellent layer, or the like, can be exemplified. These coating layers can be used alone, respectively, or a plurality of coating layers can be formed into a multi-layer to be used.

In addition, for those coating layers, there may be employed in combination an UV absorber for the purpose of protecting lenses or eyes from UV light, an IR absorber for the purpose of protecting eyes from infrared rays, a light stabilizer or antioxidant for the purpose of improving the weatherability of lenses, dye or pigment for the purpose of increasing fashionability of lenses, photochromic dye or photochromic pigment, an antistatic agent, and other known additives for improving the properties of lenses, respectively.

The primer layer is a coating layer provided for the purpose of improving the adhesiveness between the hard coat layer formed thereon and lenses, and it may also improve the impact resistance. For the primer layer, any material can be used as long as it provides high adhesivity to the obtained optical lens, and usually employed are a urethane-based resin, an epoxy-based resin, a polyester-based resin, a melanin-based resin, a primer composition mainly including polyvinylacetal, and the like. When forming the primer layer, a surface of the lens can be pre-treated by an alkali treatment, a plasma treatment, an ultraviolet treatment, or the like, if necessary, for the purpose of improving the adhesiveness.

The hard coat layer is a coating layer provided for the purpose of giving functions such as an anti-scratching property, abrasion resistance, humidity resistance, hot-water resistance, heat resistance, and weather resistance, to the lens surface. For the hard coat layer, a hard coat composition including an organosilicon compound having curing property and particulate oxide of element selected from the group consisting of Si, Al, Sn, Sb, Ta, Ce, La, Fe, Zn, W, Zr, In, and Ti and/or at least one particulate constituted of a composite oxide of those elements, are generally used. The hard coat composition preferably includes at least any of amines, amino acids, metal acetylacetonate complex, organic acid metal salt, perchloric acids, salts of perchloric acids, acids, metal chloride, and polyfunctional epoxy compound, in addition to the above components. For the hard coat composition, a suitable solvent having no influence on the lens can be also used. Obviously, the use thereof with no solvent is also possible.

The antireflection layer is usually formed on the above hard coat layer, if necessary. There are an inorganic type and an organic type for the antireflection layer, and the inorganic type is provided by the use of inorganic oxide such as $SiO_2$ and $TiO_2$ in accordance with the dry method such as a vacuum evaporation technique, a sputtering method, an ion plating method, an ion beam assist method, and a CVD method. The organic type is provided by the use of a composition which includes an organosilicon compound and a silica particle having internal cavity, in accordance with the wet method.

If necessary, an antifogging coat film, an anti-staining layer, and a water-repellent layer may be further formed on the antireflection layer. As the means for forming the antifogging coat film, the anti-staining layer, and the water-repellent layer, methods and materials for the treatment thereof, or the like are not particularly limited as long as it is within the scope of not adversely affecting the antireflection properties, and there may be employed a generally known antifogging coat treatment method, anti-staining treatment method, water-repellent treatment method, and materials.

In addition, the obtained polythiourethane-based lens may be tinted for a use with the use of a dye appropriate for the purpose so as to provide a fashionability or a photochromic property. Tinting of lens can be carried out in accordance with a generally known tinting method, and is carried out generally by the following methods: (1) a method of immersing a lens in a tinting liquid, (2) a method of subjecting coating with the use of a coating agent containing a dye, or providing a tintable coating layer and tinting the provided coating layer, (3) a method of polymerizing monomer raw materials in which tintable materials are contained, (4) a method of heating a sublimation dye to allow sublimation, and the like.

The method (1) is a method including immersing a lens material finished on a predetermined optical surface in a tinting liquid in which the dye to be used is dissolved or uniformly dispersed (tinting process), and immobilizing the dye by heating (annealing process after tinting), if necessary. There are no particular limitations on the dye used in the tinting process as long as it is a generally known dye, but an oil-soluble dye or a disperse dye is usually used. The solvent used in the tinting process is not particularly limited as long as it is the solvent in which the dye to be used can be dissolved or uniformly dispersed therein. In the tinting process, a surfactant for dispersing the dye in a tinting liquid or a carrier which encourages tinting may also be employed, if necessary.

The method (2) is not for directly tinting a plastic lens material, and it is the method either including a process of coating a plastic lens with an organic coating liquid in which a dye is dispersed or dissolved and subjecting to a curing treatment to form a tinted coating layer on a lens surface, or a process of forming a tintable coating layer on a plastic lens surface, immersing the plastic lens in a tinting liquid, and subjecting to heating to be tinted. The method (2) is a method including a process of immersing a plastic lens in a tinting liquid and subjecting to heating to be tinted.

The method (3) is a method including preliminarily dissolving a dye in monomer raw materials for a plastic lens and thereafter carrying out a polymerization. The dye to be used is not particularly limited as long as it can be uniformly dissolved or dispersed to the extent of not deteriorating the optical properties, in monomer raw materials.

As the method (4), there may be employed:
(i) a method which includes sublimating a solid sublimation dye and tinting a plastic lens;
(ii) a method which includes facing a plastic lens to a substrate to which a solution containing a sublimation dye is applied in a non-contacting manner, and heating the substrate and the lens to allow tinting; or
(iii) a method which includes transferring a transfer layer composed of a colored layer containing a sublimation dye and an adhesive layer to a plastic lens, and thereafter heating to allow tinting. Optical lenses of the invention may be tinted in accordance with any of those methods. The dye to be used is not particularly limited as long as it is a dye having a sublimating property.

EXAMPLES

Hereinafter, the invention will be explained in more detail with reference to Examples.

In Examples below, resins were prepared and following evaluations were carried out to assess their adequacy as the optical component. Of the tests on performances of the resin obtained, properties (refractive index, Abbe's number, heat resistance, and impact resistance), and heat generation temperature and viscosity upon preparing various monomers were evaluated in accordance with the following test methods, respectively.

Refractive Index (ne), Abbe's Number (ve): Refractive index and Abbe's number were respectively measured with the use of Pulfrich refractometer at 20° C.

Heat Resistance Tg (unit: ° C.) by TMA (Thermo Mechanical Analysis) penetration method (50 g load, pin tip of 0.5 mmφ, rate of temperature increase of 10° C./min) was determined as the heat resistance.

Heat Generation Measurement upon Preparation: A curing catalyst, an internal mold release agent, and an ultraviolet absorbing agent were dissolved in a polyisocyanate compound, a polythiol compound and a polyol compound were added thereto, a thermocouple thermometer equipped with a recorder is inserted therein, and data on the temperature change in 20° C. water bath were collected for 30 minutes and the temperature reached at highest was measured so as to calculate the difference in highest heat generation temperature (ΔT) by subtracting the water bath temperature of 20° C. from the highest temperature.

Viscosity Measurement of Homogeneous Solution: A curing catalyst, an internal mold release agent, and an ultraviolet absorbing agent were dissolved in a polyisocyanate compound, then a polythiol compound and a polyol compound were added thereto to be mixed and dissolved over 30 minutes at 20° C. and allowed for a reaction to take place, and thus obtained homogeneous solution was measured using a B-type viscometer.

Impact Resistance Resins obtained in Examples 1, 2, 10, 17, and 20 were subjected to an impact resistance test. 50% nondestructive weight (g) was determined by dropping balls of light weighed to heavy weighed in order onto a lens having a center thickness of 1.0 mm, from a height of 127 cm in accordance with the FDA (Food and Drug Administration) test method. Here, the term "1,000 g or greater" in Table 2 shown later means that even 1,000 g weighed ball was dropped, all samples subjected were not cracked.

Example 1

To 54.22 g of 2,5(6)-bis(isocyanatomethyl)-bicyclo[2.2.1]heptane, 0.10 g of dibutyltin dichloride as the curing catalyst, 0.25 g of internal mold release agent (product name: Zelec UN), and 0.05 g of UV absorbing agent (product name: Viosorb 583) were mixed and dissolved at 20° C., to give a homogeneous solution. To this homogeneous solution, 7.89 g of triethylene glycol and 37.89 g of 4-mercaptomethyl-1,8-dimercapto-3,6-dithiaoctane were added at once, and these were mixed and dissolved in a water bath at 20° C. over 30 minutes to give a homogeneous solution.

The difference in highest heat generation temperature upon mixing and dissolving was 2° C. The viscosity of the homogeneous solution was 27 mPa·s. Evaluation results are shown in Table 1.

After degasifying the homogenous solution at 600 Pa for 1 hour, the resultant was filtered through a 1 μm PTFE made filter, and then charged into a mold including a glass mold and tape. The mold was placed in an oven and slowly heated from a temperature of 25° C. to 120° C. over 20 hours, and the polymerization was carried out. After completing the polymerization, the mold was taken out from the oven, and mold-released to obtain a resin.

The obtained resin was further subjected to annealing at 120° C. for 4 hours. The resin thus obtained was colorless and had high transparency, thereby being preferable. The resin had a refractive index (ne) of 1.603, Abbe's number (ve) of 41, and heat resistance at 102° C. The evaluation results are shown in Table 2.

Example 2

To 56.63 g of 2,5(6)-bis(isocyanatomethyl)-bicyclo[2.2.1]heptane, 0.10 g of dibutyltin dichloride as the curing catalyst, 0.25 g of internal mold release agent (product name: Zelec UN), and 0.05 g of UV absorbing agent (product name: Viosorb 583) were mixed and dissolved at 20° C., to give a homogeneous solution. To this homogeneous solution, 8.74 g of diethylene glycol and 34.63 g of 4-mercaptomethyl-1,8-dimercapto-3,6-dithiaoctane were added at once, and these were mixed and dissolved in a water bath at 20° C. over 30 minutes to give a homogeneous solution.

The difference in highest heat generation temperature upon mixing and dissolving was 3° C. The viscosity of the homogeneous solution was 30 mPa·s. Evaluation results are shown in Table 1.

After degasifying the homogenous solution at 600 Pa for 1 hour, the resultant was filtered through a 1 μm PTFE made filter, and then charged into a mold including a glass mold and tape. The mold was placed in an oven and slowly heated from a temperature of 25° C. to 120° C. over 20 hours, and the polymerization was carried out. After completing the polymerization, the mold was taken out from the oven, and mold-released to obtain a resin. The obtained resin was further subjected to annealing at 120° C. for 4 hours.

The resin thus obtained was colorless and had high transparency, thereby being preferable. The resin had a refractive index (ne) of 1.596, Abbe's number (ve) of 41, and heat resistance at 105° C. The evaluation results are shown in Table 2.

Examples 3 to 14

The heat generations upon blending and the viscosities of the homogeneous solutions were measured in accordance with the methods in Examples 1 and 2, with the use of the component (C) described in Table 1. Evaluation results are shown in Table 1. In addition, evaluated results of properties for the resins prepared are arranged in Table 2.

Example 15

To 41.98 g of 1,3-bis(isocyanatomethyl)cyclohexane, 0.08 g of dibutyltin dichloride as the curing catalyst, 0.2 g of internal mold release agent (product-name: Zelec UN), and 0.04 g of UV absorbing agent (product name: Viosorb 583) were mixed and dissolved at 20° C., to give a homogeneous solution. To this homogeneous solution, 7.88 g of triethylene glycol and 31.36 g of a mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane were added at once, and these were mixed and dissolved in a water bath at 20° C. over 30 minutes to give a homogeneous solution.

The difference in highest heat generation temperature upon mixing and dissolving was 0.5° C. The viscosity of the homogeneous solution was 34.0 mPa·s. Evaluation results are shown in Table 1.

After degasifying the homogenous solution at 600 Pa for 1 hour, the resultant was filtered through a 1 μm PTFE made filter, and then charged into a mold including a glass mold and tape. The mold was placed in an oven and slowly heated from a temperature of 25° C. to 120° C. over 20 hours, and the polymerization was carried out. After completing the polymerization, the mold was taken out from the oven, and mold-released to obtain a resin. The obtained resin was further subjected to annealing at 120° C. for 4 hours.

The resin thus obtained was colorless and had high transparency, thereby being preferable. The resin had a refractive index (ne) of 1.596, Abbe's number (ve) of 40, and heat resistance at 87° C. The evaluation results are shown in Table 2.

Example 16

To 41.98 g of 1,3-bis(isocyanatomethyl)cyclohexane, 0.08 g of dibutyltin dichloride as the curing catalyst, 0.2 g of internal mold release agent (product name: Zelec UN), and 0.04 g of UV absorbing agent (product name: Viosorb 583) were mixed and dissolved at 20° C., to give a homogeneous solution. To this homogeneous solution, 5.73 g of diethylene glycol and 32.29 g of a mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane were added at once, and these were mixed and dissolved in a water bath at 20° C. over 30 minutes to give a homogeneous solution.

The difference in highest heat generation temperature upon mixing and dissolving was 0.8° C. The viscosity of the homogeneous solution was 41.0 mPa·s. Evaluation results are shown in Table 1.

After degasifying the homogenous solution at 600 Pa for 1 hour, the resultant was filtered through a 1 μm PTFE made filter, and then charged into a mold including a glass mold and tape. The mold was placed in an oven and slowly heated from a temperature of 25° C. to 120° C. over 20 hours, and the polymerization was carried out. After completing the polymerization, the mold was taken out from the oven, and mold-released to obtain a resin. The obtained resin was further subjected to annealing at 120° C. for 4 hours.

The resin thus obtained was colorless and had high transparency, thereby being preferable. The resin had a refractive index (ne) of 1.598, Abbe's number (ve) of 41, and heat resistance at 96° C. The evaluation results are shown in Table 2.

Example 17

To 54.22 g of 2,5(6)-bis(isocyanatomethyl)-bicyclo[2.2.1]heptane, 0.10 g of dibutyltin dichloride as the curing catalyst, 0.25 g of internal mold release agent (product name: Zelec UN), and 0.05 g of UV absorbing agent (product name: Viosorb 583) were mixed and dissolved at 20° C., to give a homogeneous solution. To this homogeneous solution, 7.89 g of triethylene glycol was added, stirred for 20 minutes at 30° C., and then 37.89 g of 4-mercaptomethyl-1,8-dimercapto-3,6-dithiaoctane was added to be mixed and dissolved therein.

The difference in highest heat generation temperature upon mixing and dissolving was 2° C. The viscosity of the homogeneous solution was 28 mPa·s.

After degasifying the homogenous solution at 600 Pa for 1 hour, the resultant was filtered through a 1 μm PTFE made filter, and then charged into a mold including a glass mold and tape. The mold was placed in an oven and slowly heated from a temperature of 25° C. to 120° C. over 20 hours, and the polymerization was carried out. After completing the polymerization, the mold was taken out from the oven, and mold-released to obtain a resin. The obtained resin was further subjected to annealing at 120° C. for 4 hours.

The resin thus obtained was colorless and had high transparency, thereby being preferable. The resin had a refractive index (ne) of 1.603, Abbe's number (ve) of 41, and heat resistance at 102° C.

Example 18

To 41.98 g of 1,3-bis(isocyanatomethyl)cyclohexane, 0.08 g of dibutyltin dichloride as the curing catalyst, 0.20 g of internal mold release agent (product name: Zelec UN), and 0.04 g of UV absorbing agent (product name: Vicsorb 583) were mixed and dissolved at 20° C., to give a homogeneous solution. To this homogeneous solution, 5.73 g of diethylene glycol was added, stirred for 30 minutes at 20° C., and then 32.29 g of a mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane was added, and mixed and dissolved therein.

The difference in highest heat generation temperature upon mixing and dissolving was 0.1° C. The viscosity of the homogeneous solution was 42 mPa·s.

After degasifying the homogenous solution at 600 Pa for 1 hour, the resultant was filtered through a 1 μm PTFE made filter, and then charged into a mold including a glass mold and tape. The mold was placed in an oven and slowly heated from a temperature of 25° C. to 120° C. over 20 hours, and the polymerization was carried out. After completing the polymerization, the mold was taken out from the oven, and mold-released to obtain a resin. The obtained resin was further subjected to annealing at 120° C. for 4 hours.

The resin thus obtained was colorless and had high transparency, thereby being preferable. The resin had a refractive index (ne) of 1.598, Abbe's number (ve) of 41, and heat resistance at 96° C.

Example 19

To 41.98 g of 1,3-bis(isocyanatomethyl)cyclohexane, 0.08 g of dibutyltin dichloride as the curing catalyst, 0.20 g of internal mold release agent (product name: Zelec UN), and 0.04 g of UV absorbing agent (product name: Viosorb 583) were mixed and dissolved at 20° C., to give a homogeneous solution. To this homogeneous solution, 7.88 g of triethylene glycol was added, stirred for 30 minutes at 20° C., and then 31.36 g of a mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane was added, and mixed and dissolved therein.

The difference in highest heat generation temperature upon mixing and dissolving was 0° C. The viscosity of the homogeneous solution was 37 mPa·s.

After degasifying the homogenous solution at 600 Pa for 1 hour, the resultant was filtered through a 1 μm PTFE made filter, and then charged into a mold including a glass mold and tape. The mold was placed in an oven and slowly heated from a temperature of 25° C. to 120° C. over 20 hours, and the polymerization was carried out. After completing the polymerization, the mold was taken out from the oven, and mold-released to obtain a resin. The obtained resin was further subjected to annealing at 120° C. for 4 hours.

The resin thus obtained was colorless and had high transparency, thereby being preferable. The resin had a refractive index (ne) of 1.596, Abbe's number (ve) of 40, and heat resistance at 87° C.

Example 20

To 57.68 g of 2,5(6)-bis(isocyanatomethyl)-bicyclo[2,2,1] heptane, 0.05 g of dibutyltin chloride as the curing catalyst, 0.25 g of internal mold release agent (product name: Zelec UN), and 0.05 g of UV absorbing agent (product name: Viosorb 583) were mixed and dissolved at 20° C., to give a homogeneous solution. To this homogeneous solution, 4.45 g of diethylene glycol was added, stirred for 60 minutes at 20° C., and then 2.60 g of ethylene glycol was further added and stirred for 60 minutes at 20° C. Thereafter, 34.63 g of 4-mercaptomethyl-1,8-dimercapto-3,6-dithiaoctane was added thereto, mixed and dissolved therein.

The difference in highest heat generation temperature upon mixing and dissolving was 0.4° C. The viscosity of the homogeneous solution was 43 mPa·s.

After degasifying the homogenous solution at 600 Pa for 1 hour, the resultant was filtered through a 1 μm PTFE made filter, and then charged into a mold including a glass mold and tape. The mold was placed in an oven and slowly heated from a temperature of 25° C. to 120° C. over 20 hours, and the polymerization was carried out. After completing the polymerization, the mold was taken out from the oven, and mold-released to obtain a resin. The obtained resin was further subjected to annealing at 120° C. for 4 hours.

The resin thus obtained was colorless and had high transparency, thereby being preferable. The resin had a refractive index (ne) of 1.598, Abbe's number (ve) of 41, and heat resistance at 109° C.

Examples 21 to 24

The heat generations upon blending and the viscosities of the homogeneous solutions were measured in accordance with the method in Example 20, with the use of the component (C) described in Table 1. Evaluation results are shown in Table 1. In addition, properties of the resins prepared are arranged in Table 2.

Comparative Example 1

To 58.76 g of 2,5(6)-bis(isocyanatomethyl)-bicyclo[2.2.1] heptane, 0.10 g of dibutyltin dichloride as the curing catalyst, 0.25 g of internal mold release agent (product name: Zelec UN), and 0.05 g of UV absorbing agent (product name: Viosorb 583) were mixed and dissolved at 20° C., to give a homogeneous solution. To this homogeneous solution, 5.31 g of ethylene glycol and 35.93 g of 4-mercaptomethyl-1,8-dimercapto-3,6-dithiaoctane were added at once, and these were mixed and dissolved in a water bath at 20° C. over 30 minutes. However, an abrupt heat generation was caused resulting in a difference in highest heat generation temperature to be 60° C., and thus the viscosity was increased due to a runaway polymerization. Therefore, it was unable to carry out an injection into a mold, and thus the resin could not be obtained.

Reference Example

To 57.38 g of 2,5(6)-bis(isocyanatomethyl)-bicyclo[2.2.1] heptane, 0.10 g of dibutyltin dichloride as the curing catalyst, 0.25 g of internal mold release agent (product name: Zelec UN), and 0.05 g of UV absorbing agent (product name: Viosorb 583) were mixed and dissolved at 20° C., to give a homogeneous solution. To this homogeneous solution, 7.52 g of 1,4-butanediol and 35.10 g of 4-mercaptomethyl-1,8-dimercapto-3,6-dithiaoctane were added at once, and these were mixed and dissolved in a water bath at 20° C. over 30 minutes. In the case of allowing a scale-up in accordance with the combination of present Examples, slight heat generation and increase in viscosity were confirmed.

TABLE 1

|  |  | Polyisocyanate | | Polythiol | | Polyol | | | | Maximum Temperature | Viscosity |
|---|---|---|---|---|---|---|---|---|---|---|---|
|  |  | type | mole | type | mole | type | mole | H | I | ΔT° C. | mPa·s |
| EXAMPLES | 1 | (A)-1 | 0.263 | (B)-1 | 0.145 | (C)-13 | 0.0525 | 0.974 | 0.194 | 2 | 27 |
|  | 2 | (A)-1 | 0.275 | (B)-1 | 0.133 | (C)-14 | 0.0824 | 0.976 | 0.292 | 3 | 30 |
|  | 3 | (A)-1 | 0.256 | (B)-1 | 0.142 | (C)-1 | 0.051 | 0.970 | 0.193 | 2 | 30 |
|  | 4 | (A)-1 | 0.240 | (B)-1 | 0.144 | (C)-2 | 0.0323 | 0.966 | 0.130 | 2 | 59 |
|  | 5 | (A)-1 | 0.216 | (B)-1 | 0.142 | (C)-3 | 0.0092 | 0.973 | 0.041 | 1 | 57 |
|  | 6 | (A)-1 | 0.241 | (B)-1 | 0.143 | (C)-4 | 0.0323 | 0.976 | 0.131 | 2.0 | 59 |
|  | 7 | (A)-1 | 0.179 | (B)-1 | 0.104 | (C)-5 | 0.036 | 0.932 | 0.187 | 0.4 | 78 |
|  | 8 | (A)-1 | 0.267 | (B)-1 | 0.146 | (C)-6 | 0.038 | 0.967 | 0.207 | 0.5 | 83 |
|  | 9 | (A)-1 | 0.267 | (B)-1 | 0.146 | (C)-7 | 0.037 | 0.973 | 0.202 | 0.6 | 79 |
|  | 10 | (A)-1 | 0.252 | (B)-1 | 0.142 | (C)-8 | 0.0275 | 0.991 | 0.162 | 0.3 | 45 |
|  | 11 | (A)-1 | 0.228 | (B)-1 | 0.142 | (C)-9 | 0.016 | 0.962 | 0.101 | 0.5 | 59 |
|  | 12 | (A)-1 | 0.252 | (B)-1 | 0.142 | (C)-10 | 0.022 | 0.981 | 0.171 | 1 | 63 |
|  | 13 | (A)-1 | 0.247 | (B)-1 | 0.134 | (C)-11 | 0.017 | 0.980 | 0.202 | 2 | 92 |
|  | 14 | (A)-1 | 0.236 | (B)-1 | 0.143 | (C)-12 | 0.0095 | 0.971 | 0.117 | 2 | 40 |
|  | 15 | (A)-2 | 0.216 | (B)-2 | 0.0855 | (C)-13 | 0.0525 | 0.966 | 0.235 | 0.5 | 34 |
|  | 16 | (A)-2 | 0.216 | (B)-2 | 0.0881 | (C)-14 | 0.0540 | 0.939 | 0.234 | 0.8 | 41 |
|  | 17 | (A)-1 | 0.263 | (B)-1 | 0.145 | (C)-13 | 0.0525 | 0.974 | 0.194 | 2 | 28 |
|  | 18 | (A)-2 | 0.216 | (B)-2 | 0.0881 | (C)-14 | 0.054 | 0.939 | 0.234 | 0.1 | 42 |
|  | 19 | (A)-2 | 0.216 | (B)-2 | 0.0855 | (C)-13 | 0.0525 | 0.966 | 0.235 | 0 | 37 |
|  | 20 | (A)-1 | 0.280 | (B)-1 | 0.133 | (C)-14 EG | 0.042 0.042 | 0.988 | 0.296 | 0.4 | 43 |
|  | 21 | (A)-1 | 0.250 | (B)-1 | 0.142 | (C)-2 (C)-6 | 0.022 0.015 | 0.971 | 0.173 | 1 | 40 |
|  | 22 | (A)-1 | 0.251 | (B)-1 | 0.143 | (C)-2 BD | 0.022 0.022 | 0.971 | 0.170 | 1 | 42 |

TABLE 1-continued

|  | Polyisocyanate | | Polythiol | | Polyol | | | | Maximum Temperature | Viscosity |
|---|---|---|---|---|---|---|---|---|---|---|
|  | type | mole | type | mole | type | mole | H | I | ΔT° C. | mPa·s |
| 23 | (A)-2 | 0.222 | (B)-2 | 0.0843 | (C)-14 EG | 0.033 0.033 | 0.947 | 0.281 | 0.1 | 107 |
| 24 | (A)-2 | 0.219 | (B)-2 | 0.0832 | (C)-13 EG | 0.033 0.033 | 0.942 | 0.284 | 0.1 | 74 |
| Comparative Example 1 | (A)-1 | 0.285 | (B)-1 | 0.138 | EG | 0.086 | 0.973 | ○ | 60 | x |

The symbols in Table 1 indicate the following contents. Hereinbelow, the average molecular weight is a molecular weight calculated from the aforementioned formula as long as it is not specified.

(A)-1: 2,5(6)-bis(isocyanatomethyl)-bicyclo[2,2,1]heptane
where, a mixture of 2,5-bis(isocyanatomethyl)-bicyclo[2,2,1]heptane and 2,6-bis(isocyanatomethyl)-bicyclo[2,2,1]heptane was used as 2,5(6)-bis(isocyanatomethyl)-bicyclo[2,2,1]heptane.
(A)-2: 1,3-bis(isocyanatomethyl)cyclohexane
(B)-1: 4-mercaptomethyl-1,8-dimercapto-3,6-dithiaoctane
(B)-2: a mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane
(C)-1: polyethylene glycol having an average molecular weight of 200
(C)-2: polyethylene glycol having an average molecular weight of 400
(C)-3: polyethylene glycol having an average molecular weight of 2,000
(C)-4: polyol having an average number of functional group obtained by reacting propylene glycol with propylene oxide of 2 and an average molecular weight of 400
(C)-5: polyol having an average number of functional group obtained by reacting propylene glycol with propylene oxide of 2 and an average molecular weight of 1,000
(C)-6: polyol having an average number of functional group obtained by reacting trimethylolpropane with ethylene oxide of 3 and an average molecular weight of 180
(C)-7: polyol having an average number of functional group obtained by reacting trimethylolpropane with propylene oxide of 3 and an average molecular weight of 190
(C)-8: polyol having an average number of functional group obtained by reacting glycerin with propylene oxide of 3 and an average molecular weight of 400
(C)-9: polyol having an average number of functional group obtained by reacting glycerin with propylene oxide of 3 and an average molecular weight of 1,000
(C)-10: polyol having an average number of functional group obtained by reacting pentaerythritol with propylene oxide of 4 and an average molecular weight of 500
(C)-11: polyol having an average number of functional group obtained by reacting sorbitol with propylene oxide of 6 and an average molecular weight of 840
(C)-12: polyol having an average number of functional group obtained by reacting sorbitol with propylene oxide of 6 and an average molecular weight of 1,530
(C)-13: TEG (triethylene glycol)
(C)-14: DEG (diethylene glycol)
BD: 1,4-butanediol
EG: ethylene glycol
x: could not be measured due to a high viscosity H: the used ratio of (A) the polyisocyanate compound to the polyol compound and the polythiol compound: a molar ratio of functional groups represented by NCO/(SH+OH),
I: a ratio of number of moles of hydroxy group to the total number of moles of thiol group and hydroxy group: $p/(p+r)$, provided that the number of moles of the hydroxy group in the polyol compound is p, and the number of moles of the thiol group in the polythiol compound is r.

TABLE 2

|  |  | Refractive Index (ne) | Abbe's number (ve) | Tg (° C.) | Impact Resistance (50% nondestructive weight) |
|---|---|---|---|---|---|
| EXAMPLES | 1 | 1.603 | 41 | 102 | 1,000 g or greater |
|  | 2 | 1.596 | 41 | 105 | 1,000 g or greater |
|  | 3 | 1.600 | 41 | 94 | — |
|  | 4 | 1.598 | 41 | 81 | — |
|  | 5 | 1.598 | 41 | 67 | — |
|  | 6 | 1.595 | 41 | 90 | — |
|  | 7 | 1.592 | 41 | 82 | — |
|  | 8 | 1.603 | 41 | 116 | — |
|  | 9 | 1.603 | 40 | 117 | — |
|  | 10 | 1.597 | 41 | 100 | 542 g |
|  | 11 | 1.593 | 41 | 84 | — |
|  | 12 | 1.596 | 41 | 108 | — |
|  | 13 | 1.596 | 41 | 111 | — |
|  | 14 | 1.594 | 41 | 94 | — |
|  | 15 | 1.596 | 40 | 87 | — |
|  | 16 | 1.598 | 41 | 96 | — |
|  | 17 | 1.603 | 41 | 102 | 1,000 g or greater |
|  | 18 | 1.598 | 41 | 96 | — |
|  | 19 | 1.596 | 40 | 87 | — |
|  | 20 | 1.598 | 41 | 109 | 1,000 g or greater |
|  | 21 | 1.596 | 40 | 87 | — |
|  | 22 | 1.600 | 41 | 93 | — |
|  | 23 | 1.599 | 40 | 99 | — |
|  | 24 | 1.596 | 40 | 87 | — |

From the above Table 1, it is understood that although (A) the polyisocyanate compound, (B) at least one polythiol compound optionally having at least one (poly) sulfide bond in a molecule, and (C) at least one polyol compound having at least one ether bond and two or more hydroxy groups in a molecule are blended at once, or alternatively the component (B) is added after adding the component (C) to the component (A), the heat generation is hardly caused as compared with Comparative Examples, and thus the temperature can be controlled more stably and also the low viscosity is obtained.

Further, in accordance with above Examples, even in the case of blending monomers including a polyisocyanate compound, a polyol compound, and a polythiol compound, the blending manipulation can be carried out without causing abrupt heat generation and viscosity increase. In addition, it is realized that the resins prepared by blending monomers of Examples have high refractive index and low dispersion, thereby being able to be used as materials for spectacle lenses. As shown in Table 2, when measurements on the impact resistance were carried out in some Examples, all of 50% nondestructive weight thereof was 500 g or greater, exhibiting a sufficient impact resistance. Therefore, the production process is suitable for industrially producing a polyurethane/thiourethane-based optical resin ideal for use in, for example, an optical component, particularly lenses such as spectacle lenses.

The invention claimed is:

1. A process for producing a polyurethane/thiourethane-based resin by polymerizing a composition comprising a polyisocyanate component;
   (B) at least one polythiol compound optionally having at least one (poly)sulfide bond in a molecule; and
   (C) at least one polyol compound having at least one ether bond and two or more hydroxy groups in a molecule;
   wherein the polyisocyanate component of said composition consists of the following component (A):
   (A) at least one polyisocyanate compound selected from the group consisting of an alicyclic isocyanate compound represented by the following Formula (1) or Formula (2):

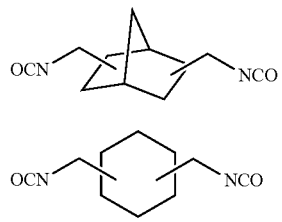

hexamethylene diisocyanate, and dicyclohexylmethane diisocyanate; and
   wherein said (C) the polyol compound having at least one ether bond and two or more hydroxy groups in a molecule is at least one kind selected from the group consisting of following (D), (E), (F), and (G):
   (D) diethylene glycol or triethylene glycol;
   (E) polyol having an average molecular weight of 200 or larger and 2,000 or smaller, which is obtained by a chain extension of the terminal by reacting a compound represented by following Formula (3) with ethylene oxide and/or propylene oxide:

HO—R1-OH  (3)

(in the above Formula (3), R1 is an ethylene group or a propylene group);
   (F) polyol having an average molecular weight of 180 or larger and 1,000 or smaller, which is obtained by a chain extension of the terminal by reacting a compound represented by following Formula (4) with ethylene oxide and/or propylene oxide:

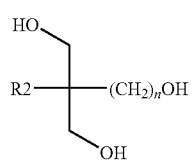

(in the above formula (4), n is 0 or 1, and R2 is a hydrogen atom, a methyl group, an ethyl group, or a hydroxyl group); and
   (G) polyol having an average molecular weight of 840 or larger and 1,530 or smaller, which is obtained by a chain extension of the terminal by reacting sorbitol with ethylene oxide and/or propylene oxide;
   wherein the process comprises adding said component (B) and said component (C) to said component (A), and heat-polymerizing the obtained mixture in the presence of a catalyst;
   and wherein the used ratio of said (A) the polyisocyanate compound, said (B) the polythiol compound optionally having at least one (poly)sulfide bond in a molecule and said (C) the polyol compound having at least one ether bond and two or more hydroxy groups in a molecule, is such that the molar ratio of functional groups represented by NCO/(SH+OH) is not less than 0.5 and not more than 3.0, and
   when given that the number of moles of a hydroxy group in said (C) the polyol compound having at least one ether bond and two or more hydroxy groups in a molecule is p, and the number of moles of a thiol group in said (B) the polythiol compound optionally having at least one (poly)sulfide bond in a molecule is r, p/(p+r) is not less than 0.001 and not more than 0.40.

2. The process for producing a polyurethane/thiourethane-based resin as claimed in claim 1, further comprising adding said component (C) to said component (A), thereafter adding said component (B) thereto, and heat-polymerizing the obtained mixture in the presence of a catalyst.

3. The process for producing a polyurethane/thiourethane-based resin as claimed in claim 1, wherein said (A) the polyisocyanate compound is at least one kind selected from compounds represented by said Formula (1) and/or said Formula (2).

4. The process for producing a polyurethane/thiourethane-based resin as claimed in claim 1, said (B) the polythiol compound optionally having at least one (poly)sulfide bond in a molecule is at least one kind selected from the group consisting of 4-mercaptomethyl-1,8-dimercapto-3,6-dithiaoctane, 1,1,3,3-tetrakis(mercaptomethylthio)propane, 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane.

5. A polyurethane/thiourethane-based resin produced by the process as claimed in claim 1.

6. An optical component comprising the polyurethane/thiourethane-based resin as claimed in claim 5.

7. A lens comprising the optical component as claimed in claim 6.

8. A spectacle lens comprising the lens as claimed in claim 7.

* * * * *